Feb. 2, 1926.
H. THOMAS
SLICING MACHINE
Filed Sept. 4, 1924      3 Sheets-Sheet 2
1,571,217
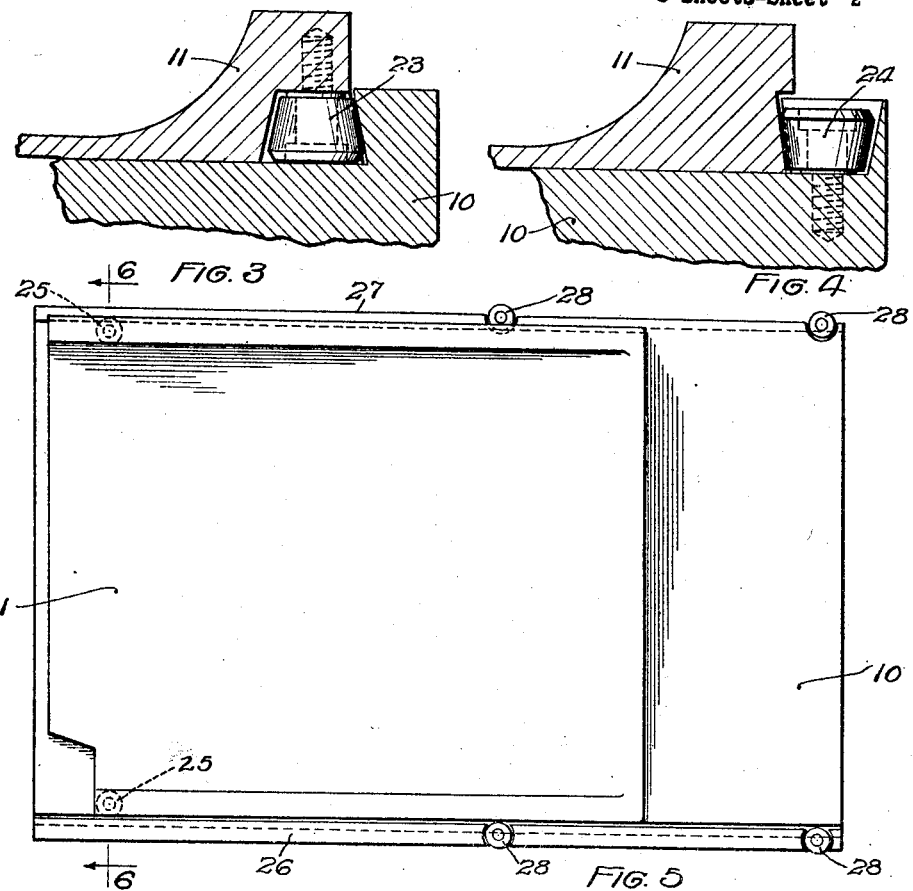
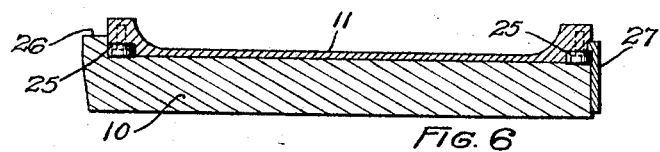
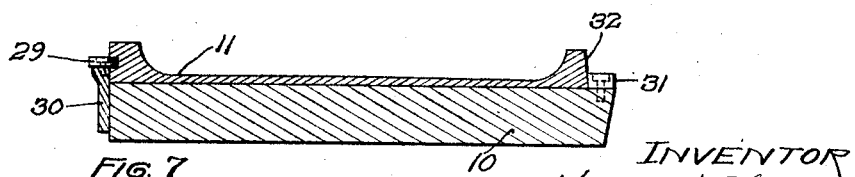

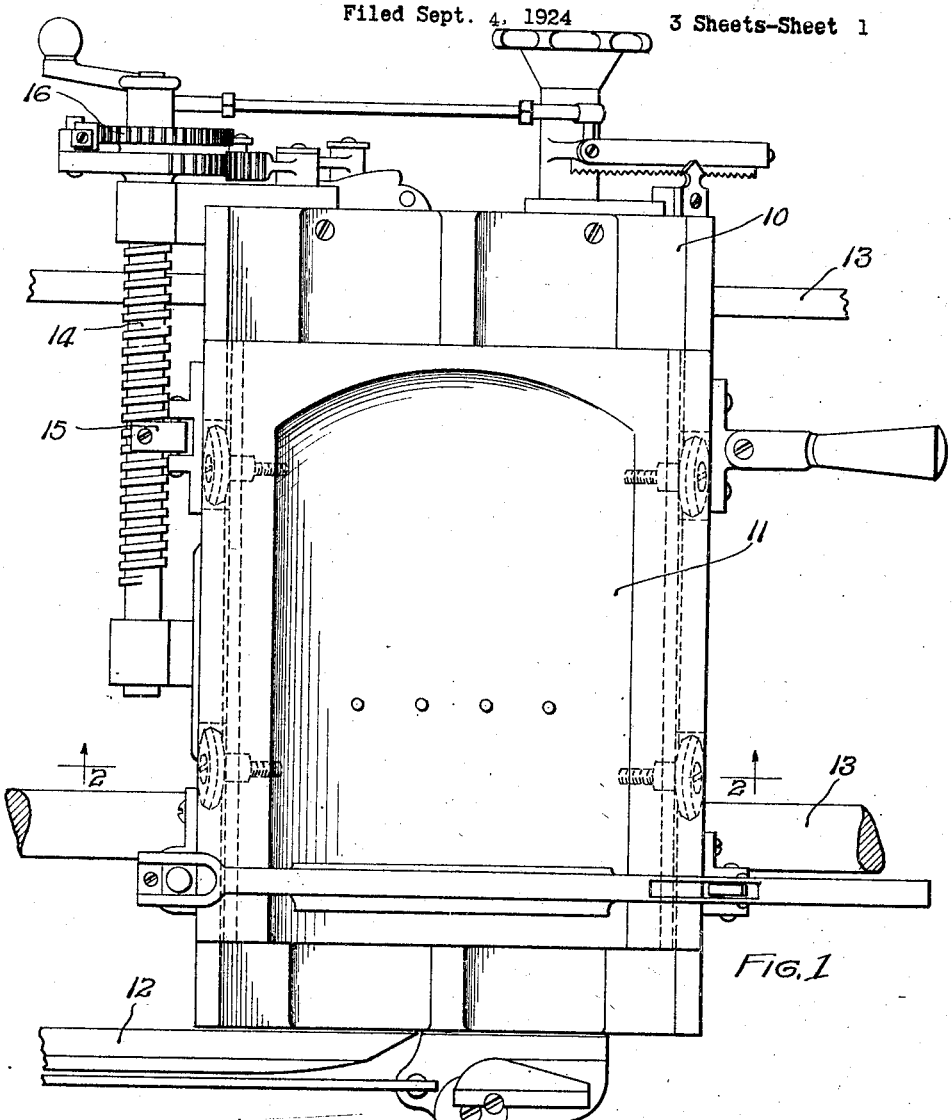
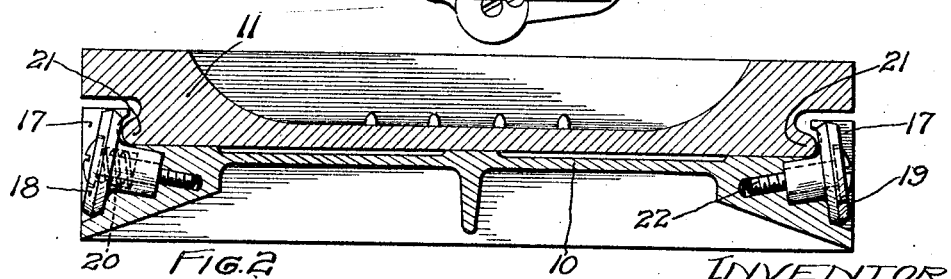

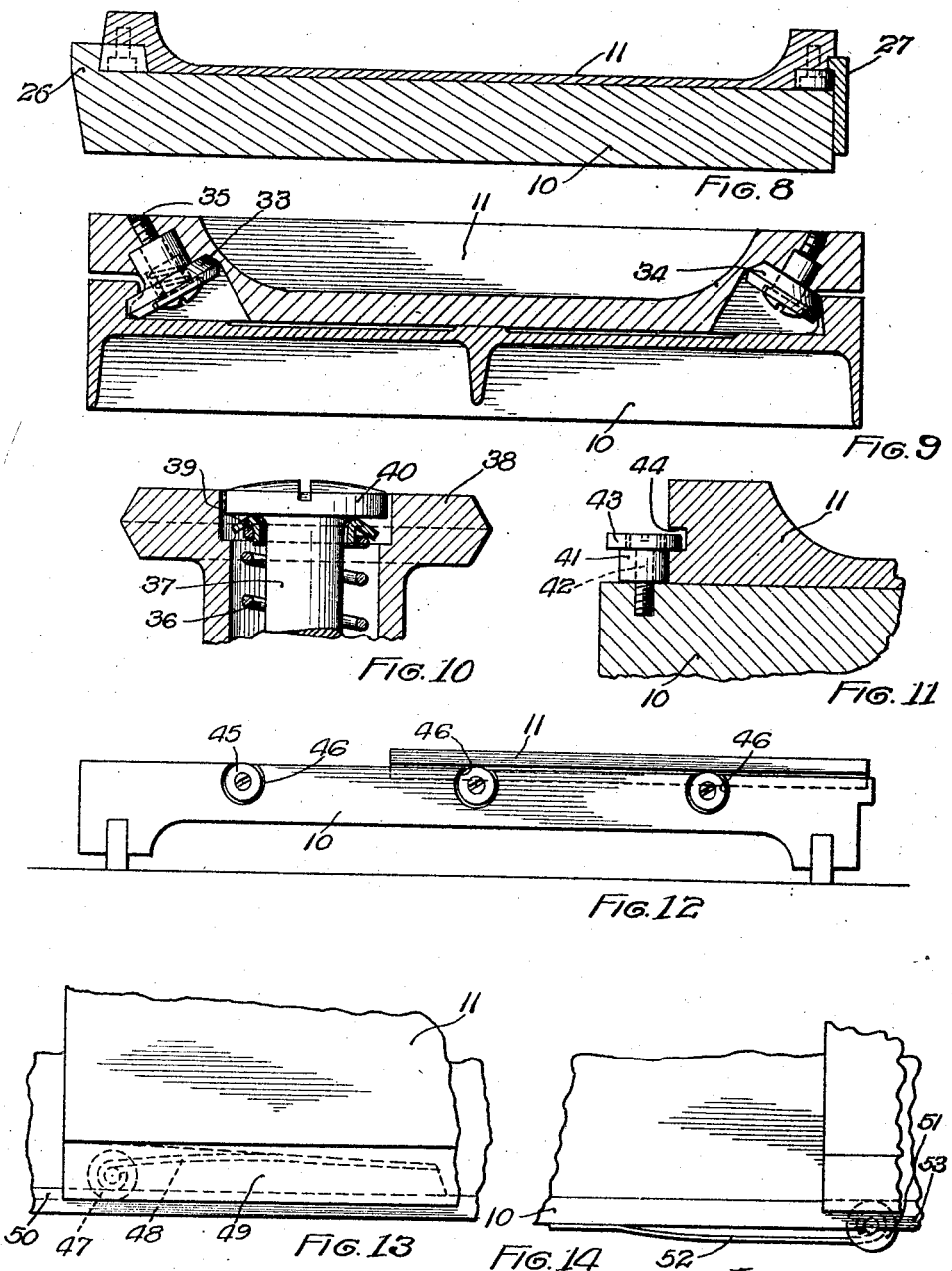

Patented Feb. 2, 1926.

1,571,217

UNITED STATES PATENT OFFICE.

HENRY THOMAS, OF LONDON, ENGLAND, ASSIGNOR TO U. S. SLICING MACHINE COMPANY, OF LA PORTE, INDIANA, A CORPORATION OF INDIANA.

SLICING MACHINE.

Application filed September 4, 1924. Serial No. 735,726.

*To all whom it may concern:*

Be it known that I, HENRY THOMAS, a subject of the King of England, residing at East Ham, London, England, have invented certain new and useful Improvements in Slicing Machines, of which the following is a specification.

This invention relates to the guiding and holding mechanism for the meat table of slicing machines and has for its object the provision of such mechanism which will facilitate the sliding movement of the meat table and which shall be of improved construction and operation.

The invention is exemplified in the combination and arrangement of parts shown in the accompanying drawings and described in the following specification, and it is more particularly pointed out in the appended claims.

In the drawings—

Fig. 1 is a plan view of a meat table and associated parts of a slicing machine showing one embodiment of the present invention applied thereto;

Fig. 2 is a section on line 2—2 of Fig. 1;

Fig. 3 is a fragmentary view showing a different mounting for a guide roller;

Fig. 4 is a view similar to Fig. 3 showing another form of roller mounting;

Fig. 5 is a top plan view of a slicing machine table showing a different arrangement of guide rollers;

Fig. 6 is a section on line 6—6 of Fig. 5;

Fig. 7 is a view similar to Fig. 6 showing a different form of the invention;

Fig. 8 is a view similar to Figs. 6 and 7 showing a slightly different form of the invention;

Fig. 9 is a transverse section of a slicing machine table showing another modification;

Fig. 10 is a fragmentary section showing a form of roller mounting;

Fig. 11 is a fragmentary view showing a different form of guide roller;

Fig. 12 is a side elevation of a slicing machine table showing a different arrangement of guide rollers; and Figs. 13 and 14 are fragmentary plan views showing other mountings for rollers.

Heretofore in slicing machines it has been usual to provide a sliding feed plate or table which is removably fitted to the carriage or under-table of the machine between a fixed guide at the one side and a spring guide at the other side of the carriage. In practice it sometimes happens, especially with machines having large tables, that owing to the position of the feed nut there is a tendency for the feed table while being moved forward, step-by-step, to turn or swing slightly and to bite at its front end against the fixed guide of the carriage or undertable. This slight swinging while causing the slices to become somewhat irregular in thickness, also increases the frictional grip between the feed table and the fixed guide and renders it more difficult to drive the machine, this being particularly the case when dirt adheres to the bearing surface of the guide. The present invention overcomes these drawbacks in a simple and effective manner by providing bearing rollers or equivalents so arranged in the fixed guide or the feed table as to prevent the feed table turning or swinging while being pushed forward. Preferably a roller is arranged in the feed table near the front end thereof and a second roller in the feed table at the rear end thereof. The rollers are arranged on opposite sides of the feed table so that under any twisting action the roller at the rear end of the feed table will bear upon the spring side and the roller at the front end will bear upon the fixed guide so that the table will have a roller contact at both points where the pressure is greatest. While a single pair of rollers arranged at diagonally opposite corners will in most cases be all that is necessary it will be understood, of course, that a greater number of rollers may be employed if desired. In those slicing machines in which the length of travel is so great compared with the length of the feed table that two rollers, one bearing on the spring side and the other on the fixed guide, cannot cooperate during the entire movement, additional rollers may be used so that whenever one roller goes out of action another comes into action.

In Fig. 1 of the drawings, the numeral 10 designates the reciprocating under-table having a feed table 11 mounted to slide thereon. The under-table 10 is reciprocated relative to the slicing knife 12 and is guided on ways 13 in a manner well known in the art. A feed screw 14 cooperates with a feed nut 15 for moving the table 11 toward the knife 12. Ratchet mechanism 16 of usual construction may be employed for operating the screw 14. The under-table 10 is provided with recesses 17 at opposite sides thereof for receiving guide rollers 18 and 19. The rollers 18 at one side of the table are provided with recesses for receiving springs 20 which resiliently press the rollers inwardly against a rib 21 on the feed table 11. The rollers 19 are held against longitudinal movement on their pivot screws 22 and both sets of rollers are inclined, as shown in Fig. 2, to provide a dovetail seat for the feed table 11. It will be apparent that the feed table 11 may be removed from its support by pressing it laterally to compress the springs 20, thus freeing the rib 21 adjacent the roller 19 from the overhanging flange of the roller. In this arrangement the rollers 18 replace the spring plate or guide heretofore employed and at the same time prevent any jamming of the table due to the position of application of force exerted by the nut 15.

Figs. 3 and 4 show different forms of guide rollers 23 and 24 which may be substituted for the roller 19. Fig. 3 shows the roller mounted on the feed table 11, while Fig. 4 shows the same form of roller mounted on the under-table 10.

In the arrangement shown in Figs. 5 and 6, a pair of rollers 25 is arranged at the front end of the feed table 11, one of the rollers bearing against the fixed guide 26 and the other against the spring guide 27. The rollers 28 are journaled on the under-table, two on the fixed guide and two on the spring guide. The construction provides for a case where one roller in a guide cannot cooperate with the feed table during the whole movement thereof, but it is preferred that only one roller at each side should bear upon the feed table at one time.

The construction shown in Fig. 7 shows the position of the rollers mounted on the under-table 10, the roller 29 being journaled on a stud secured to the spring plate 30 while the roller 31 is journaled on a stud secured to the fixed portion of the under-table 10. It will be noted that the flange of the roller 29 travels in a groove in the feed table 11, while the roller 31 is in the form of an inverse cone which bears upon an inclined face 32 of the table 11. This arrangement retains the feed table on its support, but permits removal by pressing the same laterally against the pressure of the spring plate 30.

The construction shown in Fig. 8 is in a general way similar to that shown in Fig. 6, except that the roller cooperating with the fixed guide 26 is an inverse frustum of a cone to cooperate with the overhanging portion of the guide 26 to assist in retaining the feed table in position.

In Fig. 9 a construction similar to that shown in Fig. 2 is illustrated, but in this modification the rollers 33 and 34 are journaled on inclined pivot screws 35 carried by the feed table 11 instead of the under-table 10.

One method of arranging a spring 36 on a pivot screw 37 for resiliently securing and retaining roller 38 in position on the feed table or carriage is shown in Fig. 10 where the spring bears at its outer end against an anti-friction angle washer 39 loosely mounted on the pivot screw 37 and bearing against the under side of the head 40 of the pivot screw 37.

Referring to Fig. 11, a retaining roller 41 is shown rotatably mounted on a pivot screw 42 carried by the under-table 10, the body portion of the roller 41 being arranged to contact with the top surface of the under-table. A portion of the flat head 43 of the retaining rollers engages in a groove 44 cut in the side wall of the feed table 11, the under side of the head bearing against the lower face of the groove. In this case the stem of the roller 41 bears against and guides the feed table 11 while the head 43 holds the feed table down. Rollers such as 41 may be used for guiding one side of the feed table and spring rollers such as shown at 18 in Fig. 2 may be used for the opposite side.

In Fig. 12, three retaining rollers 45 similar to rollers 19 in Fig. 2 are shown rotatably arranged within recesses 46 formed at one side of the under-table 10, said retaining rollers being so disposed that two of the rollers are always in contact with the feed table 11 whatever the position of the latter on the under-table. A corresponding set of spring rollers such as shown at 18 in Fig. 2 would be arranged at the other side of the under-table 10.

A flat retaining roller 47 is shown in Fig. 13 rotatably mounted at one end of a flat spring 48, the spring being secured at its opposite end in a recess 49 formed in the feed table 11. The roller is constrained by the spring to partly engage in a continuous groove 50 formed in the side wall of the under-table. Rollers such as 47 can be used in conjunction with rollers such as 41 in Fig. 11.

In Fig. 14, a retaining roller 51 is rotatably mounted on one end of a flat spring 52 secured at its other end to the side wall of the under-table 10 and part of the retaining roller projecting through an opening in the side wall of the under-table and being constrained by the spring to engage a continuous groove 53 in the feed table.

I claim:—

1. In a slicing machine, the combination with a feed table, of a support upon which said table is mounted to slide, a feed screw for moving said feed table upon said support, means connected with said table for engaging said feed screw, and a roller interposed between said table and support at the side of said table opposite said feed screw to prevent swinging of said feed table and consequent binding thereof due to the force exerted by said screw on said table.

2. In a slicing machine, the combination with a feed table, of a support upon which said table is mounted to slide, a feed screw for moving said feed table upon said support, means connected with said table for engaging said feed screw, and rollers interposed between said table and support to prevent swinging of said feed table and consequent binding thereof due to the force exerted by said screw on said table.

3. In a slicing machine, the combination with a support, of a feed table mounted to slide along said support, a screw for feeding said table upon said support, means connected with said table for engaging said screw, and roller guides arranged adjacent diagonally opposite corners of said feed table for preventing said table from binding on said support.

4. In a slicing machine, the combination of a feed table, a support for said feed table, and a spring-pressed roller for guiding said table on said support.

5. In a slicing machine, a feed table, a support for said feed table, and a spring-pressed roller for guiding said table on said support, said roller having an overhanging portion to retain said table in position on said support.

6. In a slicing machine, a feed table, a support for said feed table, and a roller for guiding said table on said support, said roller having an overhanging portion for retaining said table on said support.

7. In a slicing machine, a feed table, a support upon which said feed table is mounted to slide, a roller at one side of said feed table having a bearing portion arranged to operate in fixed position, and a spring-pressed roller at the opposite side of said table.

8. In a slicing machine, the combination of a feed table, a support upon which said table is mounted to slide, a roller at one side of said table, said roller being fixed against transverse movement relative to said table, and a yieldingly held guide roller at the opposite side of said table.

9. In a slicing machine, a feed table, a support upon which said table is mounted to slide, and a pair of rollers arranged at opposite sides of said table and having overhanging portions for retaining said table on said support, one of said rollers being spring-pressed.

10. In a slicing machine, a feed table, a support for said table, said support and table having cooperating guiding portions, a roller mounted on one of said portions, and a longitudinally extending rib carried by the other of said portions, said roller having an inclined flange for overhanging said rib to retain said table in position on said support.

11. In a slicing machine, a feed table, a support for said table, said support and table having cooperating guide portions at each side of said table, and a guide roller mounted on one of said portions at each side of said table, each of said rollers having overhanging portions for retaining said table and support in cooperative relation, one of said rollers being spring-pressed to permit removal of said table from said support.

12. In a slicing machine, a feed table, a support for said table, a roller for guiding said table on said support, said roller having a projecting flange thereon and having an opening therein, means cooperating with said flange to retain said table on said support, and a spring disposed in said opening for permitting movement of said roller to allow release of said table from said support.

In testimony whereof I have signed my name to this specification on this 12th day of August A. D., 1924.

HENRY THOMAS.